Oct. 6, 1931.　　　W. A. CHRYST　　　1,826,054
ELECTRIC MOTOR AND FRICTION CLUTCH THEREFOR
Filed Nov. 18, 1927
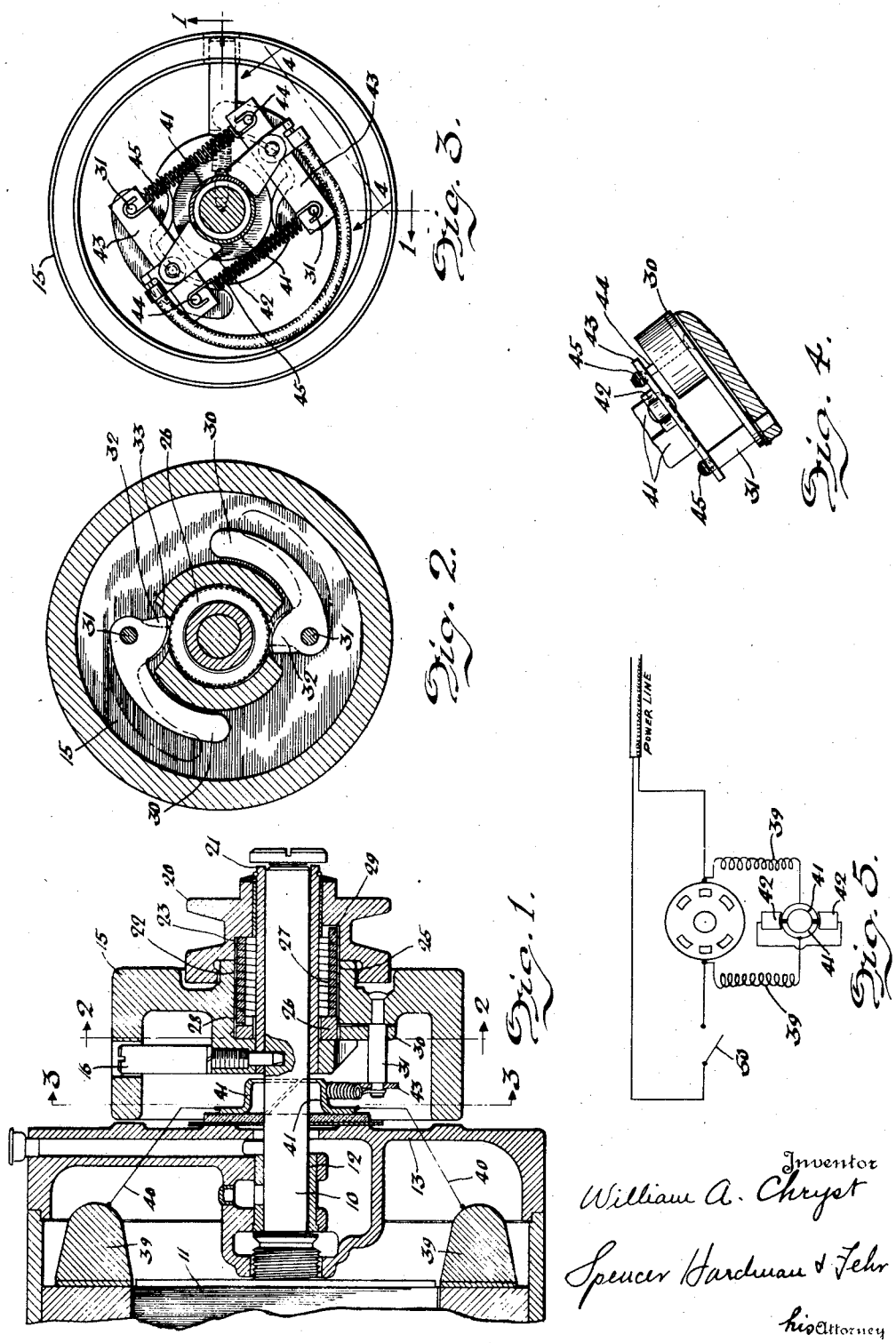

Patented Oct. 6, 1931

1,826,054

UNITED STATES PATENT OFFICE

WILLIAM A. CHRYST, OF DAYTON, OHIO, ASSIGNOR, BY MESNE ASSIGNMENTS, TO L. G. S. DEVICES CORPORATION, OF INDIANAPOLIS, INDIANA, A CORPORATION OF INDIANA

ELECTRIC MOTOR AND FRICTION CLUTCH THEREFOR

Application filed November 18, 1927. Serial No. 234,112.

This invention relates to electric motors having small starting torque and an automatic clutch for throwing on the load after attaining a certain speed.

This broad combination is well known so this invention has for one of its objects to provide a very simple, rugged, well-protected, efficient, and economically made automatic clutching device in combination with a flywheel which is fixed to the motor shaft. The motor armature and flywheel attains a certain speed in starting while running free of the load, and when the speed actuated clutch throws on the load the kinetic energy of the flywheel assists the torque of the motor in initiating the driving of the load, that is, the flywheel prevents a too sudden slowing down of the motor when the load comes on. This enables the starting winding of a split phase motor to be cut out simultaneously with the action of the clutch in throwing on the load. Another object of the invention therefore is to provide a simple and well-protected electric switch for cutting out the starting winding, said switch being located adjacent to and actuated by the same means which actuates the clutch.

Further objects and advantages of the present invention will be apparent from the following description, reference being had to the accompanying drawings, wherein a preferred form of embodiment of the present invention is clearly shown.

In the drawings:

Fig. 1 is a section through the drive end portion of a split phase electric motor built according to this invention and is taken along the broken line 1—1 of Fig. 3. The leads from the field starting winding to the automatic switch are shown diagrammatically.

Fig. 2 is a vertical section taken on line 2—2 of Fig. 1.

Fig. 3 is a vertical section along line 3—3 of Fig. 1.

Fig. 4 is a fragmentary view taken on line 4—4 of Fig. 3 and shows the construction of the switch and weighted levers which actuate the switch and clutch device.

Fig. 5 is a diagram showing how the lifting of the switch brushes breaks the circuit through the starting winding of the field.

10 designates the armature shaft which is fixed to the rotating armature 11 and has a bearing 12 supported by the end plate 13 of the motor housing. The armature shaft 10 has a flywheel 15 rigidly fixed thereto by the screw 16 as clearly shown. Shaft 10 projects outwardly beyond flywheel 15 and a driving pulley 20 is loosely mounted upon this projecting portion by any suitable means. Preferably a bearing sleeve 21 surrounds the projecting portion of shaft 10 and is held fixed thereto by the screw 16, and the driving pulley 20 is mounted loosely upon this sleeve 21. Flywheel 15 and pulley 20 have their adjacent faces in abutment. The flywheel 15 is provided with a cylindrical axial recess 22 and the adjacent side of the pulley 20 has a similar recess 23 in alignment with recess 22. It is thus seen that the two recesses 22 and 23 form a closed annular chamber 25 when the parts are assembled as shown in Fig. 1. Within the flywheel end of this chamber 25 a friction ring 26 is loosely inserted. An expanding coil clutch spring 27 is inserted within chamber 25 so that one end 28 thereof is relatively fixed to the friction ring 26 while its other end 29 is relatively fixed to the drive pulley 20. It is to be noted that the clutch spring 27 is normally of slightly smaller outer diameter than that of the annular chamber 25 so that there will be little or no friction between flywheel 15 and spring 27 when said spring is in normal or unexpanded condition (as shown in Fig. 1).

Two centrifugally actuated weighted levers 30 are pivotally mounted within flywheel 15 upon the pins 31 fixed to the flywheel 15 to swing in the plane of the friction ring 26. Each lever 30 has a toe 32 which projects through openings 33 provided therefor in the flywheel hub and lies clear of but adjacent to the outer periphery of the friction ring 26 when the centrifugal levers 30 are in the in position. When levers 30 are thrown outwardly by centrifugal action at a predetermined speed of the armature shaft 10, the toes 32 thereof are forced against the friction ring 26 and so tend to drag the end 28 of the clutch spring 27 around in the direction of rotation of the shaft 10. Now if the pulley 20 be belted to a device requiring torque to drive it the end 29 of the clutch spring will be more or less anchored stationary whereupon spring 27 will be partially unwound and therefore expanded into high frictional contact with the peripheral walls of recesses 22 and 23 causing a driving engagement between flywheel 15 and pulley 20. This form of automatic clutch will engage smoothly and without shock since there is a gradually increasing frictional engagement instead of a positive engagement between the speed actuated levers 30 and the friction ring 26. This permits a certain amount of slippage between the clutch spring 27 and the rapidly rotating flywheel 15.

In split phase motors it is desirable to disconnect or break the circuit through the starting winding after the motor has attained speed. In the above described motor this is accomplished in a very simple manner by providing an electric switch adjacent to and actuated by the outward movement of the weighted levers 30. The two stationary leads 40 from the starting windings 39 in the motor field are connected respectively to the opposed insulated semi-circular segments 41 which are suitably mounted upon the outside of the motor casing 13 concentric with the shaft 10 and project within the flywheel 15 adjacent the weighted levers 30. Since there is stored in the flywheel 15 kinetic energy, the speed of the motor is not decreased to a very great extend when the clutch is engaged. This is very desirable where the motor is used in driving a load with a relatively large torque under normal operating conditions, as the kinetic energy of the flywheel will supply the additional torque required to accelerate the load from standstill to normal operating speed.

Two diametrically opposed short-circuiting contacts 42 are located to ride upon the stationary contacts 41 and are insulatedly mounted upon the two levers 43 which are pivoted respectively at one end to the pivot pins 31 and are fixed to the weighted levers 30 at the other end by means of pins 44. It is thus seen that the switch levers 43 are fixed to and extend substantially parallel with the centrifugal levers 30 and both pivot about the pins 31. The two small tension springs 45 each extend from the movable end of one lever 43 to the pivot pin 31 of the opposite lever 43 and so tend to hold the short-circuiting contacts 42 in contact with the segments 41 and also the levers 30 in their in position thus maintaining disengagement of the clutch spring 27 at low motor speeds. Therefore, when the motor is started by closing the main switch 50 (see Fig. 5) the circuit through the starting windings 39 will be closed so long as the movable contacts 42 remain riding upon the stationary segments 41, that is, so long as the levers 30 remain in their in position. When the motor has attained a predetermined speed the pulley 20 is clutched to the flywheel 15, as described above, thus throwing on the load and simultaneously breaking the circuit in the starting windings.

While the form of embodiment of the present invention as herein disclosed, constitutes a preferred form, it is to be understood that other forms might be adopted, all coming within the scope of the claims which follow.

What is claimed is as follows:

1. In an electric motor, in combination, an armature, a shaft fixed to and driven by said armature, a fixed flywheel and a loose pulley on said shaft adjacent each other, said flywheel and pulley having similar axially aligned recesses on their adjacent sides forming an annular chamber concentric with said shaft, a coil clutch spring within said chamber having one end fixed to said pulley, and centrifugally operated means mounted upon said flywheel for fixing the other end of said coil spring to said flywheel at a predetermined speed to cause said clutch spring to partially unwind and frictionally engage the walls of said annular chamber, whereby said pulley is driven by said flywheel above said predetermined speed.

2. In an electric motor, in combination, an armature, a shaft fixed to and driven by said armature, a fixed flywheel and a loose pulley on said shaft in running contact with each other, said flywheel and pulley having equi-diameter axial recesses on their abutting sides forming an annular chamber about said shaft, a coil clutch spring within said chamber having one end engaging said pulley and its opposite end free from said flywheel below a predetermined speed, and centrifugally actuated means driven by said shaft for fixing said opposite end to said flywheel at said predetermined speed to cause said clutch spring to partially unwind and clutch said flywheel and pulley together.

3. In an electric motor, in combination, an armature, a shaft fixed to and driven by said armature, a fixed flywheel and a loose pulley on said shaft in running contact with each other, said flywheel and pulley having equi-diameter axial recesses on their abutting sides forming an annular chamber about said shaft, a coil clutch spring within said chamber having one end engaging said pulley, and its opposite end fixed to a loose ring within said recess in said flywheel, and a centrifugally actuated lever mounted upon said flywheel for frictionally engaging said loose ring at a predetermined speed and thereby cause said clutch spring to partially unwind and clutch said flywheel and pulley together.

4. In an electric motor, in combination, an armature, a shaft fixed to and driven by said armature, a fixed flywheel and a loose pulley on said shaft in running contact with each other, said flywheel and pulley having equi-diameter axial recesses on their abutting sides forming an annular chamber about said shaft, a coil clutch spring within said chamber having one end engaging said pulley, and its opposite end fixed to a loose ring within said recess in said flywheel, and a centrifugally actuated lever mounted upon said flywheel for frictionally engaging said loose ring at a predetermined speed and thereby cause said clutch spring to partially unwind and clutch said flywheel and pulley together, and a starting coil for said motor having a switch therefor adjacent said flywheel, the movable member of said switch being actuated by said centrifugally actuated lever.

5. In an electric motor, in combination, an armature, a shaft fixed to and driven by said armature, a fixed flywheel and a loose pulley on said shaft in running contact with each other, said flywheel and pulley having equi-diameter axial recesses on their abutting sides forming an annular chamber about said shaft, a coil clutch spring within said chamber having one end engaging said pulley and its opposite end free from said flywheel below a predetermined speed, and centrifugally actuated means driven by said shaft for fixing said opposite end to said flywheel at said predetermined speed to cause said clutch spring to partially unwind and clutch said flywheel and pulley together, and a starting coil for said motor having a switch therefor adjacent said flywheel, the movable member of said switch being actuated by said centrifugally actuated means.

6. In an electric motor, in combination, an armature, a shaft fixed to and driven by said armature, a fixed flywheel and a loose pulley on said shaft adjacent each other, said flywheel and pulley having similar axially aligned recesses on their adjacent sides forming an annular chamber concentric with said shaft, a coil clutch spring within said chamber having one end fixed to said pulley, and centrifugally operated means mounted upon said flywheel for fixing the other end of said coil spring to said flywheel at a predetermined speed to cause said clutch spring to partially unwind and frictionally engage the walls of said annular chamber, whereby said pulley is driven by said flywheel above said predetermined speed, and a starting coil for said motor having a switch therefor within said flywheel, the movable member of said switch being actuated by said centrifugally actuated means.

7. In an electric motor, in combination, an armature, a shaft fixed to and driven by said armature, a fixed flywheel and a loose pulley on said shaft adjacent each other, said flywheel having an axially aligned recess on the edge adjacent said pulley forming an annular chamber concentric with said shaft, a coil clutch spring within said chamber having one end fixed to said pulley, and centrifugally operated means mounted upon said flywheel for fixing the other end of said coil spring to said flywheel at a predetermined speed to cause said clutch spring to partially unwind and frictionally engage the walls of said annular chamber, whereby said pulley is driven by said flywheel above said predetermined speed.

8. In an electric motor, in combination, an armature, a shaft fixed to and driven by said armature, a fixed flywheel and a loose pulley on said shaft in running contact with each other, said pulley having an axially aligned recess on the side abutting the flywheel forming an annular chamber about said shaft, a coil clutch spring within said chamber having one end engaging said pulley and its opposite end free from said flywheel below a predetermined speed, and centrifugally actuated means driven by said shaft for fixing said opposite end to said flywheel at said predetermined speed to cause said clutch spring to partially unwind and clutch said flywheel and pulley together.

9. A device for transmitting power from a split phase motor to a pulley comprising, in combination, a driven shaft, a fixed flywheel and a loose pulley on said shaft in running contact with each other said flywheel having an annular recess coaxial with the axis of said flywheel and in the side adjacent said pulley forming a chamber about said shaft, a friction ring mounted on said shaft in said chamber, a coil clutch spring within said chamber having one end fixed to said pulley and the other end fixed to said friction ring, and centrifugally actuated means driven by said shaft for frictionally engaging said friction ring to said flywheel at a predetermined speed to cause said clutch spring to partially unwind and clutch said flywheel and pulley together.

10. A clutch for transmitting power from the armature shaft of a motor to a pulley comprising, in combination, a sleeve, a clutch member mounted on said sleeve, said clutch member and said sleeve being fixed to said shaft, a freely movable clutch member on said sleeve, a recess in one of said members forming an annular chamber about said sleeve, a friction ring mounted in said chamber, a coil spring mounted in said chamber one end of which is fixed to the movable clutch member and the other end to the friction ring and centrifugally actuated means carried by said clutch member fixed to said shaft, for frictionally engaging said friction ring thereby partially unwinding said spring and clutching said clutch members together.

11. In combination, a rotatable driving member, a rotatable driven member, said driving member being provided with an axial cylindrical recess, a helical spring located in said recess and operatively connected at one end to said driven member, a clutch-actuating member rotatable with said driving member and connectible to and disconnectible from the other end of said spring, and means carried by said driving member and responsive to centrifugal force for connecting said clutch-actuating member with or disconnecting it from said spring.

12. In combination, a rotatable driving member, a rotatable driven member, said driving member being provided with an axial cylindrical recess, a helical spring located in said recess and operatively connected at one end to said driven member, a clutch-actuating member rotatable with said driving member and connectible to and disconnectible from the other end of said spring, and means responsive to centrifugal force for connecting said clutch-actuating member with or disconnecting it from said spring.

13. The combination set forth in claim 12 with the addition that said driven member has an axial cylindrical recess into which said spring extends.

14. In combination, a driven device, a driving motor having a relatively low starting torque, a rotatable driven clutch member connected to said driven device, a rotatable driving clutch member connected to said motor, said driving clutch member having considerable mass whereby it will possess considerable momentum, one of said clutch members having an axial recess, a helical spring located in said recess and operatively connected to the other clutch member, and means carried by said driving clutch member and controlled in response to centrifugal force for connecting said spring to said recessed member whereby it may have a torque imposed upon it causing it to expand into gripping engagement with the walls of such recess.

15. In combination, a rotatable driving member, a rotatable driven member coaxial therewith, clutch means normally disengaged from said driving member but connectible thereto to clutch said two members together, clutch actuating means for connecting said clutch means to said driving member, said actuating means transmitting between said driving member and said clutch means only a fraction of the total torque transmitted between such parts and means carried by said driving member and responsive to centrifugal force for controlling said actuating means.

16. In combination, a rotatable driving member, a rotatable driven member coaxial therewith, clutch means normally disengaged from said driving member but connectible thereto to clutch said two members together, clutch actuating means for connecting said clutch means to said driving member, said actuating means transmitting between said driving member and said clutch means only a fraction of the total torque transmitted between such parts and means responsive to centrifugal force for controlling said actuating means.

17. In combination, a rotatable driving member, a rotatable driven member coaxial therewith, clutch means normally disengaged from said driving member but connectible thereto to clutch said two members together, clutch actuating means for connecting said clutch means to said driving member, said actuating means transmitting between said driving member and said clutch means only a fraction of the total torque transmitted between such parts and means responsive to the rotational velocity of said driving member for controlling said actuating means.

18. In combination, two relatively rotatable coaxial clutch members, one of said members being provided with a circular axial recess, a helical spring secured to the other of said members and extending into said recess, said spring being normally of smaller diameter than said recess, clutch-actuating means for operatively connecting said spring to said recessed member, said actuating means including a member located in said recess and secured to the adjacent end of said spring and an actuating member rotatable with said recessed member and movable into frictional engagement with the member connected to said spring, and means responsive to the speed of one of said clutch members for moving the actuating member.

19. In combination, two relatively rotatable coaxial clutch members, one of said members being provided with a circular axial recess, a helical spring secured to the other of said members and extending into said recess, said spring being normally of smaller diameter than said recess, clutch-actuating means for operatively connecting said spring to said recessed member, said actuating means including a member located in said recess and secured to the adjacent end of said spring and an actuating member rotatable with said recessed member and movable into engagement with the member connected to said spring, and means responsive to the speed of one of said clutch members for moving the actuating member.

20. In combination, two relatively rotatable coaxial members, one of said clutch members being provided with a circular axial recess, a helical spring operatively connected to the other of said clutch members and extending into said recess, said spring normally having a diameter less than that of said recess, and actuating means for operatively connecting said recessed member to said spring, said actuating means including a part located within the recess, said part being provided with an abutment, and the extreme end of said spring being bent to engage said abutment to interconnect said part and said spring.

21. In combination, two relatively rotatable coaxial members, one of said clutch members being provided with a circular axial recess, a helical spring operatively connected to the other of said clutch members and extending into said recess, said spring normally having a diameter less than that of said recess, and actuating means for operatively connecting said recessed member to said spring, said actuating means including a part located within the recess and connected to the adjacent end of said spring and one or more other parts rotatable with said recessed clutch and movable transversely thereof into frictional engagement with said first named part to interconnect said spring and recessed clutch member.

In testimony whereof I hereto affix my signature.

WILLIAM A. CHRYST.